United States Patent [19]

Denes et al.

[11] Patent Number: 5,705,233
[45] Date of Patent: Jan. 6, 1998

[54] FIBER-REINFORCED CEMENTITIOUS COMPOSITES

[75] Inventors: Ferencz S. Denes; Raymond A. Young; Zhong-Qiang Hua, all of Madison, Wis.; Dorel Feldman; Zhihong Zheng, both of Quebec, Canada

[73] Assignee: Wisconsin Alumni Research Foundation, Madison, Wis.

[21] Appl. No.: 470,843

[22] Filed: Jun. 6, 1995

Related U.S. Application Data

[63] Continuation-in-part of Ser. No. 410,472, Mar. 24, 1995.
[51] Int. Cl.$^6$ .............................. H05H 1/00; B28B 1/00; B28B 7/00
[52] U.S. Cl. ..................... 427/538; 427/322; 427/533; 427/535; 427/536; 427/539
[58] Field of Search ................................ 427/322, 533, 427/535, 536, 538, 539

[56] References Cited

PUBLICATIONS

Aminabhavi, T.M., et al., "Use of Polymers in Concrete Technology," *Rev. Macromol. Chem. Phys.*, C22: 1–55 (1982–1983).

André, V., et al., "Influence of Plasma Pretreatment of Polypropylene on the Adhesion with Aluminium: An Auger Spectroscopic Study," *Surface and Interface Analysis*, 16:241–245 (1990).

André, V., et al., "Polypropylene and Aluminum Adhesion," pp. 425–431 (1990).

Aveston, J., et al., "Fibre Reinforced Cements—Scientific Foundations for Specifications," *Composites— Standards, Testing and Design*, 93–103.

Brewis, D.M., "Principles of the Adhesion of High Polymers. Part 2. The Bonding of Polyolefins," *J. Materials Sci.*, 3:262–265 (1968).

Brewis, D.M., and D. Briggs. "Adhesion to Polyethylene and Polypropylene," *Polymer*, 22:7–16 (1981).

Clark, D.T., and R. Wilson, "Selective Surface Modification of Polymers by Means of Hydrogen and Oxygen Plasmas," *J. Pol. Sci.*, 91:837–853 (1982).

d'Agostino, R. (ed.), *Plasma Deposition, Treatment, and Etching of Polymers*, Academic Press, Inc., Boston.

deVekey, R.C., and A.J. Majumdar, "Determining Bond Strength in Fibre–Reinforced Composites," *Mag. Concrete Res.*, 20:229–234 (1968).

Hall, J.R, et al., "Activated Gas Plasma Surface Treatment of Polymers for Adhesive Bonding," *J. App. Pol. Sci.*, 13:2085–2096 (1969).

Hannant, D.J., "Durability of Cement Sheets Reinforced with Fibrillated Polypropylene Networks," *Mag. Concrete Res.*, 35:197–204 (1983).

Hannant, D.J., and J.G. Keer, "Autogenous Healing of Thin Cement Based Sheets," *Cement and Concrete Res.*, 13:357–365 (1983).

Hannant, D.J., et al., "Polypropylene Film in Cement Based Materials," *Composites*, 88–95 (Apr., 1978).

Hibbert, A.P., and D.J. Jannant, "Toughness of Fibre Cement Composites," *Composites*, pp. 105–111 (Apr., 1982).

Hinton, T., and A. Keller, "Embrittlement and Stress Cracking of Polyethylene by Fuming Nitric Acid," *J. App. Polymer Sci.*, 13:715–751 (1969).

(List continued on next page.)

*Primary Examiner*—Richard Weisberger
*Attorney, Agent, or Firm*—Quarles & Brady

[57] ABSTRACT

Treatment in a plasma of a composite reinforcing agent improves the bonding of the agent to the cement portion of the composite. This method facilitates the use of inexpensive readily available light, high tensile strength fibers as reinforcing agents. The reinforcing agents are activated by providing on the surface thereof charged atoms compatible with the cementitious portion of a composite desired to be strengthened.

10 Claims, 4 Drawing Sheets

PUBLICATIONS

Hollahan, J.R., and A.T. Bell (eds.), *Techniques and Applications of Plasma Chemistry*, John Wiley and Sons, New York, 1974.

Ladizesky, N.H., and I.M. Ward, "A Study of the Adhesion of Drawn Polyethylene Fibre/Polymeric Resin Systems," *J. Materials Sci.*, 18:533–544 (1983).

Liston, E.M., et al., "Plasma Surface Modification of Polymers for Improved Adhesion: A Critical Review," *J. Adhesion Sci. Technol.*, 7: 1091–1127 (1993).

Marchant, R.E., et al., "Effect of Nitrogen RF Plasma on the Properties of Polypropylene," *J. App. Pol. Sci., App. Pol. Symp.*, 42:125–138 (1988).

Mijovic, J.S., and J.A. Koutsky, "Etching of Polymeric Surfaces: A Review," *Polym.–Plast. Technol. Eng.*, 9:139–179 (1977).

Moshonov, A., and Y. Avny, "The use of Acetylene Glow Discharge for Improving Adhesive Bonding of Polymeric Films," *J. App. Pol. Sci.*, 25:771–781 (1980).

Postema, A.R., et al., "Polyethylene: Effect of Chlorosulfonation of Ultra–High Strength Polyethylene Fibres on Mechanical Properties and Bonding with Gypsum Plaster," *Polymer Bulletin*, 16:1–6 (1986).

Shah, K., and C.L. Beatty, "Control of Interfacial Strength of Composites by R.F. Plasma Treatment of Fillers," pp. 232–235.

Shen, M. (ed.), *Plasma Chemistry of Polymers*, Marcel Dekker, Inc., New York (1976).

Yasuda, H., *Plasma Polymerization*, Academic Press, Inc., (1985).

FIBER-REINFORCED CEMENTITIOUS COMPOSITES

CROSS REFERENCE TO RELATED APPLICATION

This application is a continuation-in-part of application Ser. No. 08/410,472, filed on Mar. 24, 1995.

FIELD OF THE INVENTION

The present invention relates to construction materials and more particularly to reinforced cementitious composites used to produce construction materials.

BACKGROUND OF THE INVENTION

Cement is a synthetic inorganic material used to adhere the fine and rough aggregates in concrete. Cement typically includes anhydrous crystalline calcium silicate ($Ca_3SiO_5$ and $Ca_2SiO_4$), lime (CaO, 60%), and alumina (a complex of aluminum silicate, 5%)[1]. In the presence of water, the silicates react to form hydrates and calcium hydroxide:

$2Ca_3SiO_5 + 6H_2O \rightarrow Ca_3Si_2O_7 \cdot 3H_2O + 3Ca(OH)_2$
$2Ca_2SiO_4 + 4H_2O \rightarrow Ca_3Si_2O_7 \cdot 3H_2O + 3Ca(OH)_2$.

The hardened structure of cement is not well understood since it depends on the three-dimensional nature and the complex atomic arrangement of the polymer, which strongly depends on the quantities of the ingredients, the curing time and the composition of the concrete aggregates. The hardening mechanism starts with the formation of a plastic paste that includes water and calcium hydroxide. The process continues with formation of silicate fibrils from calcium silicate particles. The growth of the fibrils results in a three-dimensional network which includes tunnels and cavities. As the hardening process evolves, crystallized calcium hydroxide partially fills the cavities. The vacant voids, which most likely result from shrinkage of crystallizing calcium hydroxide, represent the "weak link" in the cement. Research directed to correcting this defect has focussed on incorporating of cement-void fillers such as dextrans, polysaccharides and polymeric sulfur.

Another important way to reinforce cement matrices is to incorporate fibers, such as steel, asbestos, glass, or synthetics into the cement composites[2]. Aveston and coworkers [3] have suggested applying the theory of multiple cracking and crack suppression in brittle matrix composites to explain the behavior of fiber-reinforced cement, particularly cement reinforced with steel wire and carbon fibers.

Two commercially available thin sheet cement reinforcing agents are asbestos and glass fibers. Asbestos is an important cement reinforcing material because of its chemical and thermal inertness, fibrous structure and high elastic modulus. However, health risks associated with the manufacture of asbestos-cement based materials have restricted their use in recent years. Asbestos-based cement composites also often exhibit brittle failure, while glass fibre reinforced cements are sensitive to age and curing under alkali conditions[4]. Even recently developed cement based composites made from alkali resistant glass fibers become brittle after prolonged storage in the presence of atmospheric moisture or in liquid water environments[5], reducing the efficiency and desirability of these reinforcing agents.

Synthetic fibers are strong competitors to supplement or replace glass and asbestos fiber reinforcing agents. Acrylic fibers are one of the most important types of fibers as reinforcing agents for ambient-cured cement composites[6]. These materials offer the following advantages as reinforcing agents for cement: high elastic modulus, good alkali resistance and good adhesion. Wet stretch, plastic stretch or heat-transfer fluid mediated stretching techniques assure fiber orientation in the composites, which is required for high modulus characteristics.

The polyolefins meet many of the requirements for a superb synthetic reinforcing fiber. Polypropylene in particular would be a very desirable reinforcing agent. Fibers from this material are chemically inert and fairly thermally stable (melting point about 165° C.). They are the lightest of the commercial textile fibers (specific gravity: 0.90–0.92 g/cm$^3$). Polypropylene fibers are inexpensive and exhibit excellent mechanical properties such as strength, stiffness, and extensibility, which do not vary with changes in relative humidity. The weight to strength ratio of these fibers is the best among the common fibers. Because of their high crystallinity and absence of polar functional groups they are not moisture sensitive. Notably, however, polyolefins, particularly polypropylene, have not been widely used in cement composites because of adhesion problems for the fibers in the cement matrix.

Literature data indicate that to obtain good adhesion between polyolefin fibers and another material it is usually necessary to carry out a pretreatment. Brewis and Briggs[7] reviewed the problem of adhesion to polyethylene and polypropylene and discussed the role of weak boundary layers, surface energy, wettability and specific interactions on the mechanism of adhesion. Data in Table 1, presented by those authors emphasize the variety of methods employed by different research groups in order to improve the adhesion of polyolefinic materials. It was indicated that the most widely used pretreatments are carried out under corona discharge for films and under flame conditions for thicker substrates. Also, chemical modifications are suggested for treatment of complex shaped objects.

TABLE 1

| Various Surface Pretreatments for Polyolefins | |
|---|---|
| Chlorine + U.V. radiation | Visking Corporation U.S. Pat. No. 2,502,841 |
| U.V. radiation | W. Berry, R. A. Rose and C. R. Bruce, BP 723 631 |
| Dichromate/sulfuric acid | P. V. Horton, U.S. Pat. No. 2,668,134 |
| Hot chlorinated solvents | J. J. Ziccarelli, Mod. Plast., 40:126 (1962) |
| Flame treatment | W. H. Kreidl, U.S. Pat. No. 2,632,921; M. F. Kritchever, U.S. Pat. No. 2,648,097 |
| Corona discharge treatment | A. Traver, U.S. Pat. No. 3,018,189 |
| CASING | R. H. Hansen, H. Schonhorn, J. Poly. Sci. B4:203 (1966) |

Although a large amount of research has been carried out on mechanisms of adhesion, it is still poorly understood. Two main areas of inquiry have been: (a) whether the adhesion problems of polyolefins are due to weak boundary layers of "inadequate wetting" and (b) which criteria for wetting are most appropriate to consider when predicting adhesion. It has been emphasized that each adhesion situation must be considered on its own merits, by taking into account the effects of chemical composition of the surface (nature and density of functional groups), surface energy-wettability and strength of interaction with the adhesives.

Liquid and plasma etching have been utilized to modify the surface of materials for improved adhesion. Mijovic and Koutsky[8] reviewed the effects of various liquid and plasma etching pretreatments on commercially produced fibers, films, sheets, and molded products. A large variety of organic and inorganic compounds, including organic solvents, acids, and bases, and mixtures thereof, have been used as liquid etchers. Selective etching was found to increase the surface roughness of polymeric surfaces, modify the nature and the density of surface functionalities and remove undesired low molecular weight byproducts. Those authors indicated that liquid etching is the most widely used technique for modifying polymeric surfaces. Mechanical etching, laser beam etching and ion beam etching have also been investigated.

Wet chemical and flame techniques also provide an efficient way of functionalizing polymers, however the structural and morphological modifications extend beyond the surface layers and often involve experimental conditions which are detrimental to the integrity of these materials. The depth and extent of sub-surface modification is difficult to control and can result in alteration of the bulk properties of polymeric films or fibers treated in this manner. Etchant-chemicals cause extraction and segregation of composite constituents and/or introduce impurities that can diminish considerably the adhesion characteristics of treated polymeric surfaces.

Plasma induced surface modification and/or grafting is another important method for activating polymeric surfaces. This method can provide desired surface characteristics without changing the bulk properties of substrates. Plasma deposition and etching of polymers have been extensively studied [9–16,8]. Depending on the nature of the plasma gases and on the experimental parameters, new chemical composition surface layers and various surface morphologies can be created on polymeric substrates. This approach is particularly important for modifying polyolefinic surfaces because of their chemical inertness and heat sensitivity. Table 2 exhibits some of the plasma treatments that have been applied to polyolefinic substrate surfaces to try to enhance adhesive bonding. In Table 2, PP designates polypropylene, PE designates polyethylene. It is noteworthy that no mention is made in the literature of the use of plasma treated polypropylene fibrous materials in cement based composites.

TABLE 2

Cold Plasma Treatments of Polyolefin Substrates

| Type of Substrate | Nature of Plasma | Results | Ref. |
|---|---|---|---|
| PP film | Low pressure Corona 800 W; 70 kHz; 50–1000 Pa. | Improved adhesion to aluminum | 17 |
| UHM-PE monofilm | RF-100 W; 13.56 MHz | Improved adhesion to epoxy resin | 18 |
| PP | RF inductively coupled N$_2$-plasma | Increased surface polarity; oxygen and and nitrogen incorporation; unchanged bulk properties | 19 |
| PE; PP | Capacitively coupled 13.56 MHz RF plasma Plasma gases: O$_2$, He, N$_2$ | Increased bond strengths O$_2$ and He Plasma effective for PE; He not effective for PP; N$_2$ effective only for PE | 20 |
| PE | 50 Hz AC glow-discharge acetylene plasma | The presence of PL-polymer acetylene on the film Platinum electronic surfaces lead to improved adhesion joint strength with epoxy resin | 21 |
| PP | Non-equilibrium Plasma | Improved adhesion of PP to Al coat | 22 |

References Cited

1. R. B. Seymour and C. E. Carraher, Jr., Polymer Chemistry, An Introduction, Third Edition, Marcel Dekker, Inc., (1992).

2. D. J. Hannant, Fibre Cements and Fibre Concretes, John Wiley & Sons, (1978).

3. J. A. Aveston, R. A. Mercer and J. M. Sillwood, N.P.L. Conference Proceedings. Guilford, IPC Science and Technology Press Ltd. Apr. 1974. pp. 93–103.

4. D. J. Hannant, J. J. Zonsveld and D. C. Hughes, Composites, Vol. 9 No. 2 Apr. 1978. pp. 83–88.

5. J. W. Galloway, R. I. T. Williams and K. D. Raithby, Crowthorne Transport and Road Research.

6. J. I. Kroschwitz ed., Polymers: Fibers and Textiles, A Compendium, John Wiley & Sons Inc., 1990.

7. D. M. Brewis and D. Briggs, Polymer Vol. 22, Jan. 7, (1981).

8. J. S. Mijovic and J. A. Koutsky, Polym.-Plast. Technol. Eng., 9(2), 139–179 (1977).

9. R. d'Agostino, Plasma Deposition, Treatment and Etching of Polymers, Academic Press, New York (1990).

10. H. V. Boenig, Plasma Science & Technology, Cornell University Press, Ithaca, N.Y. (1982).

11. H. Yasuda, Plasma Polymerization, Academic Press, New York (1985).

12. J. R. Hollahan and A. T. Bell eds., Techniques and Applications of Plasma Chemistry, John Wiley & Sons Inc., (1974).

13. M. Shen ed., Plasma Chemistry of Polymers, Marcel Dekker Inc., (1976).

14. H. V. Boenig ed., Advances in Low-Temperature Plasma Chemistry, Technology, Applications, Technomic Publishing Co., Inc., (1991).

15. D. T. Clark and R. Wilson, J. Polym. Csi.,: Polymer Chemistry Edition, Vol. 91:837–853 (1983).

16. D. T. Clark and W. J. Feast, Eds., Polymer Surfaces, John Wiley & Sons Inc. (1978).

17. V. Andre, Y. DePuydt, F. Arefi, J. Amouroux, P. Bertrand and J. F. Silvain, Metallization of Polymers, ACS Symposium Series No. 440 (1990).

18. N. H. Ladizesky and I. M. Ward, Journal of Materials Science, 18:533–544 (1983).

19. R. E. Marchant, C. J. Chou and C. Khoo, Journal Applied Polymer Science=Applied Polymer Symposium 42:125 (1988).

20. J. R. Hall, C. A. L. Westerdahl, A. T. Devine and M. J. Bodnar, J.Appl. Polym. Sci., Vol. 13:2085–2096 (1969).

21. A. Moshonov and Y. Avny, J.Appl. Polym. Sci., Vol. 25:771–781 (1980).

22. Surface and Interface Analysis, Vol. 16:241–245 (1990).

SUMMARY OF THE INVENTION

The present invention is summarized in that an improved cementitious matrix includes an activated fibrous hydrocarbon polymer reinforcing agent having 10–100% charged silicon atoms, 0–10% halogen atoms, 10–90% oxygen atoms and less than 80% carbon atoms at its surface. The invention also includes the fibrous hydrocarbon polymers having 10–100% charged silicon, 0–10% halogen atoms 10–90% oxygen atoms and less than 80% carbon atoms at its surface.

The present invention is also summarized in that a method for forming activated polyolefinic fibers includes the steps of exposing the reinforcing agent to a low energy plasma that includes gaseous halosilicon ions for a time sufficient to implant a sufficient quantity of the ions onto the polymer surface that the treated fiber has the above noted characteristics. Such a treated fiber, when incorporated into a cementitious matrix, improves the mechanical properties of the cementitious matrix when compared to a comparable matrix reinforced with the untreated reinforcing agent.

It is an object of the present invention to improve the adhesion, chemical resistance, tensile, shear, and bond strengths, temperature resistance, and other properties of cementitious matrices and composites that include a cement matrix portion.

It is another object of the present invention to improve surface compatibility of fibrous substrates with cementitious matrices.

It is an advantage of the present invention that the activated fibers for incorporating into cement based composites achieve the desired objects, yet are produced inexpensively in a commercially available plasma polymerization apparatus.

It is another advantage of the present invention that a plasma polymerization method used to activate the reinforcing fibers uses a non-polymer forming gas, thereby avoiding both sample and reactor contamination.

It is still another advantage of the present invention that the surface modification uses a dry process, thereby avoiding the inconveniences and pollution problems associated with liquid-phase etching methods.

It is a feature of the present invention that the enhanced polarity and compatibility of modified fibrous substrates results from the implantation onto the fiber surfaces of Si—O and Si—OH functional groups, and from the generation of unsaturated bonds through plasma-induced dehydrogenation.

Other objects, features, and advantages will become apparent upon consideration of the following detailed description of the preferred embodiment considered in light of the attached drawings.

DETAILED DESCRIPTION OF THE INVENTION

The present invention concerns a method for treating a hydrocarbon reinforcing agent in a gas plasma to generate a highly reactive, or "activated," form of the reinforcing agent which can be incorporated into a cementitious matrix, especially cement, having improved strength and related physical characteristics. A cementitious matrix is a matrix that is used to bind other materials together. In the preferred case of concrete, a silicon-containing cement binds the large and small aggregate components together.

The reinforcing agent can be an inert fibrous or polymeric hydrocarbon material having such reinforcing characteristics as are known and appreciated in the art of reinforced composites. The untreated reinforcing agent is characterized as having greater than 50% carbon atoms, when tested by ESCA analysis, and most preferably has greater than 90% carbon at its surface. In addition to pure aliphatic hydrocarbon polymers, the reinforcing agent can be, for example, a polyamide, polyimide, or polyaramide. Among the hydrocarbon polymers, polyolefins such as polypropylene and polyethylene are preferred. Polypropylene is most preferred as a reinforcing agent in that it is recognized as having the highest tensile strength among hydrocarbons and is also very inexpensive. Based upon the understanding in the art of fiber-reinforcement of cements in concrete, and upon the results reported in the Examples, a fiber length suitable for use in the present invention is less than 100 mm, with the preferred length being in the range 10 to 30 mm.

The use of the modified fibers as reinforcing agents in cementitious composites such as concrete yields materials of very high strength but reduced weight. The present invention overcomes the bonding limitations previously observed with polymeric fibrous materials such as polypropylene. As a result of the improved bonding characteristics, composites produced as described herein are generally 10–15% stronger than composites produced using comparable untreated reinforcing agents.

After treatment of the reinforcing agent in a plasma as described herein, the surface of the agent contains 10–100% silicon, 0–10% halogen atoms, 10–90% oxygen atoms and less than 80% carbon atoms. A preferred activated reinforcing agent contains 10–30% silicon, 0–5% halogen, 40–70% oxygen and less than 20% carbon. The surface composition can be varied by adjusting the gas flow rate, the plasma energy and the exposure time, and tested empirically in a manner understood in the art.

One important aspect of the invention is the recognition of the advantage of providing a compatible bridge between the reinforcing agent and the cementitious matrix. Cement is a finely powdered substance which possesses strong adhesive powers when combined with water. Cement typically includes a significant amount of silicon. The inventors have thus recognized the desirability of providing charged silicon atoms on the surface of the activated reinforcing agent. A second important recognition by the inventors is the advantage of providing a reactive ion, such as a halogen ion, preferably a chlorine ion, attached to the silicon-modified reinforcing agent. Such a Si-halogen bond is moisture sensitive and, in the presence of water, leads to Si—O linkages under open laboratory conditions.

On the basis of the two preceding aspects, the preferred plasma gas for activating the reinforcing agent is $SiCl_4$. The activation method which takes advantage of the simultaneous action of extremely active Si-based cationic species and halo-anionic species is a standard gas plasma reaction that can be accomplished in commercially available plasma reactors. It is desired and preferred that relatively low energy plasma conditions be employed in the plasma-treatment method. Particularly, the energy should be sufficiently high to form the desired ionized species, but not so high as to break a significant percentage (no more than 30% breakage, preferably less than 15% breakage) of the Si-halogen bonds of the reactive intermediates. One of ordinary skill in the art will understand that as the number of Si-halogen bonds in the product is reduced, the ability of the activated reinforcing agent to bond to the cement material is diminished. A suitable plasma energy range is about 0.5 eV to 20 eV. A preferable range is 1–2 eV. In a plasma of between about 0.5 eV and about 20 eV, $SiCl_4$ breaks down mainly into $Si^+Cl_3$ and $Si^+Cl_2$. Whereas $SiCl_4$ is tetrahedral, $Si^+Cl_3$ is planar, short lived, and very reactive. These reactive species are attracted to the surfaces of reinforcing agents. $SiCl_4$ is also advantageously used since it is a non-polymer-forming gas so it cannot contaminate the reactor or deposit unbound polymer on the treated substrate.

Suitable plasma reaction conditions are set forth below in the Examples. Aside from the general guidelines described, one of ordinary skill is sufficiently familiar with plasma conditions to adjust the reaction to accommodate different substrates and gases and to modify the surface properties of the activated substrates.

When $SiCl_4$ converts to its more reactive species, free chlorine is also evolved. Free chlorine is generally undesirable in the reactor because it interferes with the attraction of halo-silica for the surface of the reinforcing agent. It is, therefore, desirable to reduce the amount of free chlorine in the plasma reactor. To prevent the attachment of significant amounts of chlorine ions to the surface, the free chlorine atoms can be trapped on a material that accepts free halogen atoms, such as aluminum. If aluminum is used, as is preferred, chlorine is trapped in the form of $AlCl_3$, by coating the electrode surfaces with aluminum foil and by grounding the lower electrode to introduce self-bias. A chlorine trapping process such as this during deposition of $SiCl_x$ molecular fragments onto the fibrous surfaces is extremely important to avoid the interfering processes of chlorine atoms.

Although it is generally disfavored that there be an available population of free chlorine ions, one offsetting advantage of the presence of such ions is the ability to etch the surface of the reinforcing agent, thereby increasing the specific surface area of the agent, exposing additional sites for attachment of Si—$Cl_x$ fragments, resulting in even better adhesion and contact with the cementitious phase.

The following plasma-induced surface modification mechanism is suggested:

(1) Reinforcing agent+$SiCl_4$+Al→reinforcing agent –$SiCl_x$+$AlCl_3$, (where $x \leq 4$).

(2) Reinforcing agent-$SiCl_x$+$H_2O$→reinforcing agent-Si—$(OH)_x$.

The Si—$(OH)_x$ groups on the surfaces of the activated reinforcing agent bring about improved hydrophilicity, as a result of the terminal OH groups, and enhanced compatibility with silicon-containing inorganic materials such as cement. The presence of Si—OH groups on the surfaces of both the cement material and the activated reinforcing agent permits the formation during curing of strong Si—O—Si bonds between the two. It will be understood that as the number of such bonds is increased, the adhesion between the cement and the reinforcing agent becomes increasingly quartz-like, particularly because of the cross-linking effect achieved with the multivalent Si atoms. To achieve the most adhesion benefit, it is preferred that the reinforcing step take place as soon as possible after activating the reinforcing agent, preferably within 24 hours, and at least within about 1 month.

It is also envisioned that other plasma gases in which another cement-compatible element can replace the Si atom can accomplish essentially the same surface activation of reinforcing agents. A cement-compatible element is one that can, like the silicon atoms in cement, form a chemical bond to the fiber. In particular, plasma-ionizing halogenated compounds containing boron, tin, or lead in place of silicon, would be appropriate. In particular, boron trichloride ($BCl_3$), cyclic halosilicones, and hexachlorodisilane are envisioned as useful plasma gases. The ionizing material needs to yield a relatively water soluble product that is relatively non-hydrophobic. Among all the compounds listed, silicon tetrachloride is most preferred because it is an inexpensive and readily available byproduct of the silicon industry. The other gases are recognized as more expensive, and therefore less preferred, alternatives. It is also possible to produce the desired reactive species by activating a solid silicon compound, such as silicon powder, with chlorine gas under plasma conditions. Such a reaction would generate the reactive Si—$Cl_x$ intermediates useful in the present invention.

In summary, the low energy plasma treatment of an inert reinforcing agent with silicon tetrachloride or an analogous material such as those described, adds polar functional cement-compatible groups and increases surface roughness without affecting the bulk properties of the reinforcing agent. As a result, the modified reinforcing agent exhibits improved surface polarity and improved compatibility with silicon-based cementitious matrices.

Because the species generated in the plasma are so reactive, the method is extremely efficient when compared to other gas plasma reactions, allowing even the most inert substrates to be modified. Only the very outermost surface layers of the substrates (approximately the outermost 2,000 Å) are affected by the treatment. As a result, only small quantities of chemicals are required for plasma treatment and the energy requirements are minimal. In contrast, existing liquid etching methods consume large quantities of hazardous chemicals, and selectively extract low and high molecular weight components from the substrate, generate pits and holes on the exposed surfaces, swell the substrates, require long etching times and difficult etchant removal steps.

The incorporation of the activated fibers into a cement-containing composite, such as concrete, proceeds according to standard methods known to the art. To achieve the desired increase in mechanical properties, activated fiber is added to the cement matrix during composite formation in the amount of <10% by volume, preferably <5% by volume, and most preferably <1% by volume. As is detailed in the Examples, clear advantages are seen in the strength of concrete thus prepared, in comparison to concrete reinforced with untreated hydrocarbon fibers. One of ordinary skill will recognize that maximizing a particular property of the composite will not necessarily maximize any or every other property. Accordingly, the length and amount of fiber to be added for a particular application should be determined on a case-by-case basis after evaluation of the particular needs and circumstances of the application.

The following examples are intended to be exemplary of, but not limiting on, the invention.

EXAMPLES

Example 1

Treatment of Polypropylene Fibers in $SiCl_4$ Plasma

Fibrillated polypropylene fibers were purchased from Plycon, Inc., Ayerr's, Montreal, Quebec, Canada, and were used as received. High-purity silicon (IV) chloride was used in all of the experiments. All of the handling procedures were carried out in a glove box under an argon blanket.

The surface modifications of polypropylene fibers under $SiCl_4$-cold plasma conditions were carried out in a commercially available parallel plate stainless cylindrical reactor (e.g., Technics Planar Etch II, Model PEII) with an electrode diameter of 20 cm and spacing of 3 cm. The upper electrode was connected to the RF power supply (30 Kc) and the lower electrode was grounded. Neither the electrodes nor the base plate of the reactor were thermostated, because of the short treatment times. The surface temperatures were close to ambient temperature. The reactor was equipped with two vacuum lines which were connected to the reaction chamber by means of stainless steel tubing, positioned symmetrically through the center of the lower electrode. A high capacity vacuum pump assured the quick evacuation of the chamber and the establishment of equilibrium gas flow conditions by adjustment of a valve. Each experiment was preceded by cycles of vacuuming and repressurizing the reaction chamber with argon to avoid possible contamination. Both electrodes were covered with aluminum foil to limit direct deposition of polymer-like structures from plasma-generated active species and to trap the excess chlorine-based active species. The fibrous polypropylene samples were packed tightly on the aluminum substrate on the lower electrode. Both sides of the fibers were treated in consecutive experiments.

In a typical experiment, the polypropylene fibers were positioned on the aluminum-covered lower electrode, the upper part of the reaction vessel was locked, and the system was evacuated. The trap was cooled down using liquid nitrogen. After reaching the base pressure level, stainless tubing connecting the reactor to the source of $SiCl_4$ gas was evacuated.

When the entire system was evacuated, $SiCl_4$ gas was admitted into the reactor at the selected pressure and flow rate. The plasma was then ignited and the discharge was sustained for the selected time period. At the end of the reaction time, the RF power was disconnected, the source of $SiCl_4$ was closed, and the system was evacuated to base pressure level. The reactor was then opened and the treated polypropylene sample was removed for subsequent analysis.

The following conditions were employed during the plasma treatments:

Plasma gas: $SiCl_4$
RF power: 20 W
Base pressure: 60 mTorr
Pressure in the absence of plasma: 200 mTorr
Pressure in the presence of plasma: 230 mTorr
Temperature of the electrodes: 25° C.
$SiCl_4$ flow rate: 13 sccm
Reaction period: 5 minutes The plasma-treated polypropylene samples acquired a pale yellow surface color, indicative of the presence of CO groups and unsaturation which have been associated with the presence of $SiCl_x$ and $Si-(OH)_x$ groups and with improved wettability and decreased contact angle values.

Example 2

Analysis of Surface Atomic Composition of Polypropylene Fibers (Treated and Untreated)

The $SiCl_4$-plasma treated polypropylene fibers were compared with untreated polypropylene fibers by ESCA analysis and wettability analysis.

X-ray photoelectron spectroscopy (ESCA)

Analysis of the surface atomic composition of $SiCl_4$-plasma treated polypropylene fibers and virgin polypropylene fibers was carried out using X-ray photoelectron spectroscopy (ESCA-Perkin-Elmer Physical Electronics 05400 small area system; Mg source; 15 kV, 300 W). The ESCA analysis involved determining surface carbon ($C_{1s}$), oxygen ($O_{1s}$) and silicon ($Si_{2p}$) concentrations. All of the plasma-treated samples were stored under open laboratory conditions to facilitate the oxidation of Si—Cl surface groups.

Figure 1:
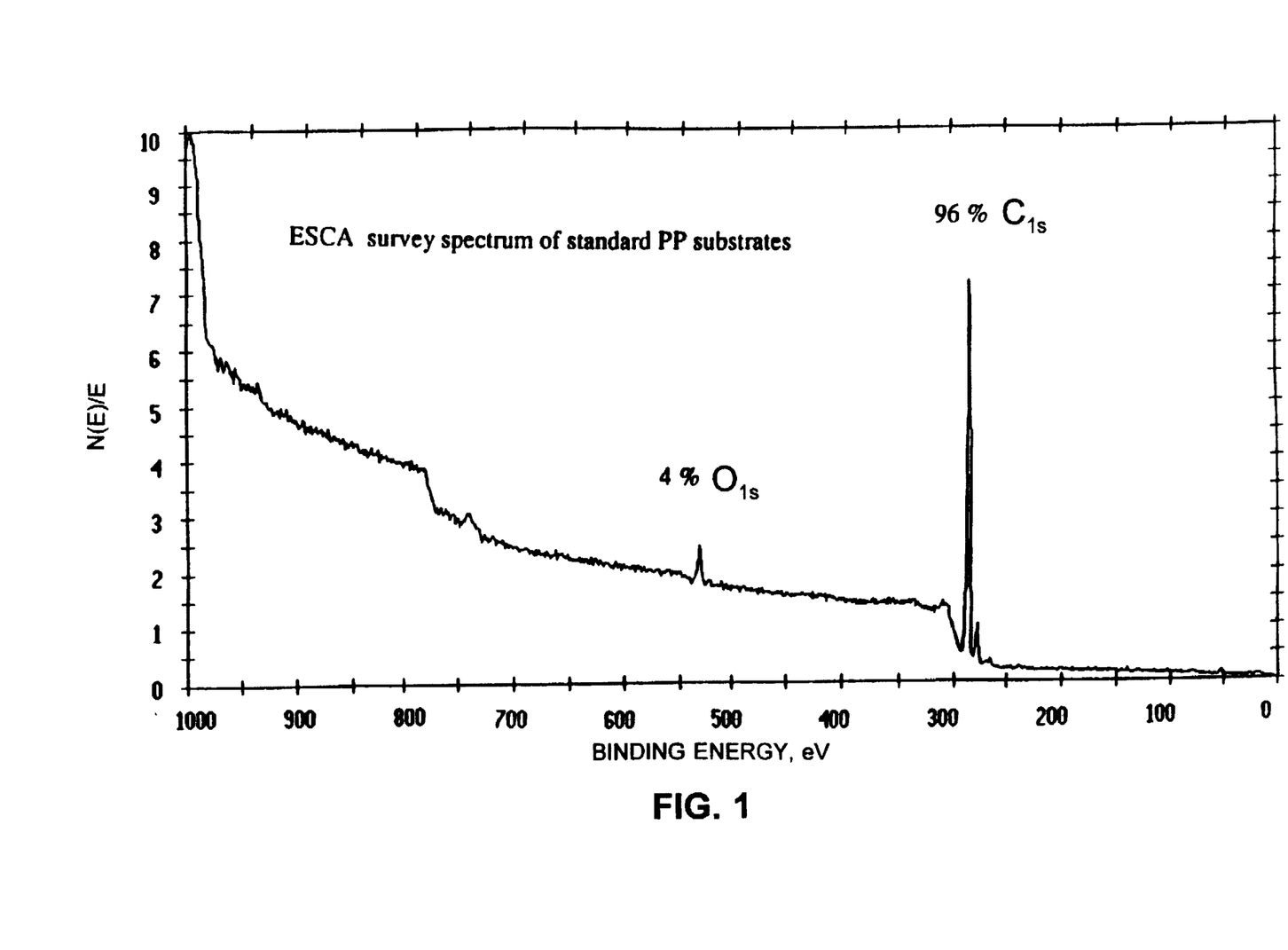
FIG. 1 shows an ESCA analysis of untreated polypropylene fibers.
Figure 2:
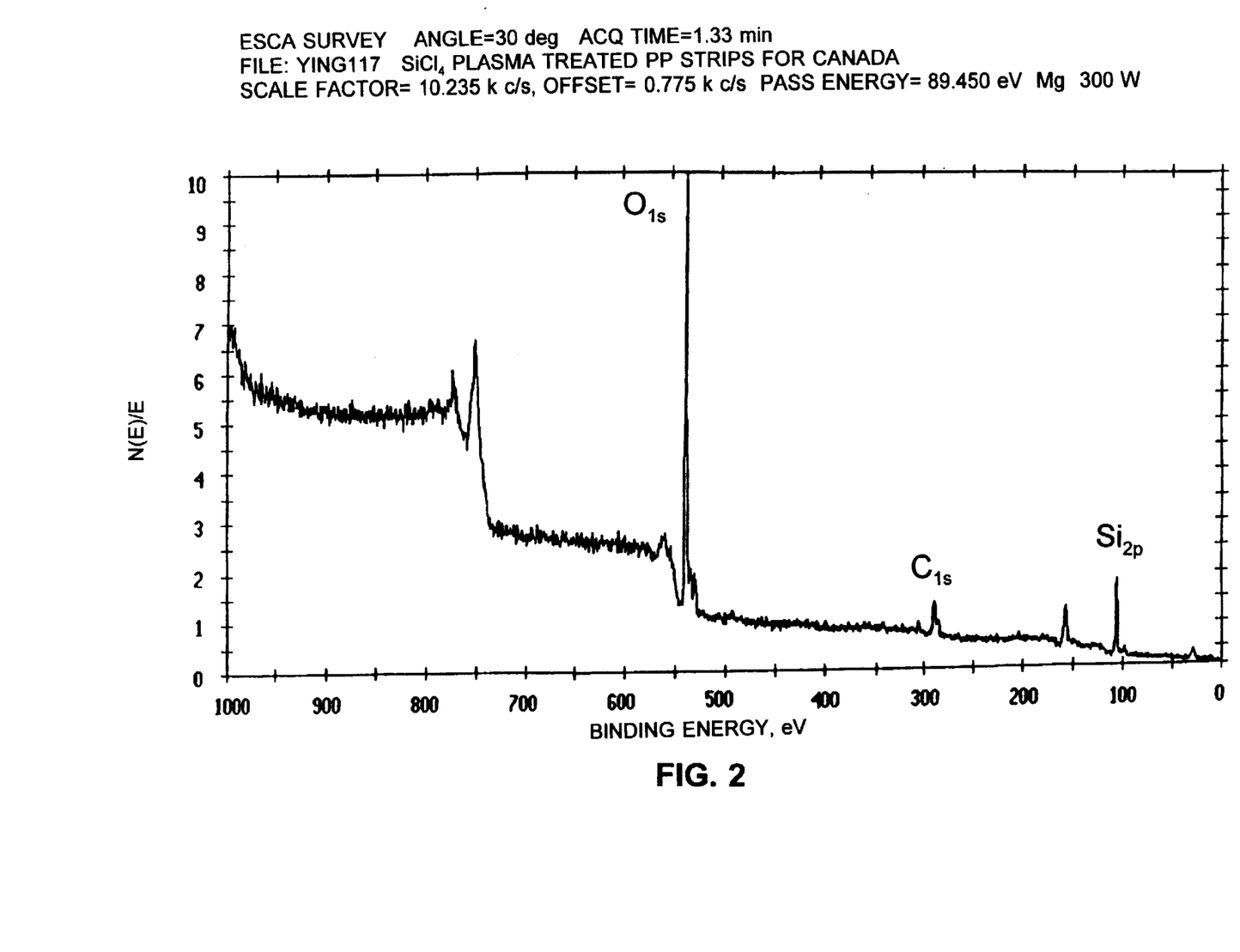
FIG. 2 shows an ESCA analysis of polypropylene fibers treated according to the method of the present invention.

FIGS. 1 and 2 compare directly the surface composition of untreated and treated polypropylene fibers by ESCA analysis. Virgin polypropylene, shown in FIG. 1, exhibits a characteristic high carbon content (96% $C_{1s}$). A slight amount of oxidation (4%, $O_{1s}$), probably caused by additives or oxidation reactions during processing is also noted.

Significant differences are observed in the ESCA spectrum of $SiCl_4$-plasma treated polypropylene fibers of FIG. 2. Marked increase in both oxygen (60.72%, $O_{1s}$) and silicon (19.55%, $Si_{2p}$) content are observed on the surfaces of the treated polypropylene fibers. These increases are coupled with a significant decrease in carbon content (15.51%, $C_{1s}$) compared to the untreated material. The ESCA analyses also indicate that the treated polypropylene fibers have a very low chlorine content of 4.22% $Cl_{2s}$.

Wetting analysis

All wetting force estimations were performed with the aid of a computer-assisted Cahn Dynamic Contact Angle Analyzer. Advancing and receding contact angles were determined in the presence of water. The advancing and receding forces, and the corresponding contact angle values, were obtained using the Wilhelmy method. According to Wilhelmy, when force=$\gamma_{LV}\cos\theta$, the advancing force, $F_a$, and receding force, $F_r$, are:

$$F_a = \gamma_{LV}\cos\theta_a \quad (1)$$

$$F_r = \gamma_{LV}\cos\theta_r \quad (2)$$

The maximum force, $F_m$, when the fiber pulls out from the probe liquid, assuming a 0° contact angle when the fiber pulls out from the liquid, is $$F_m = \gamma_{LV} \quad (3)$$

Combining equations 1 and 3, and 2 and 3, results in the following relationships:

$F_a/F_m = \cos\theta_a$ $F_r/F_m = \cos\theta_r$

Figure 3:
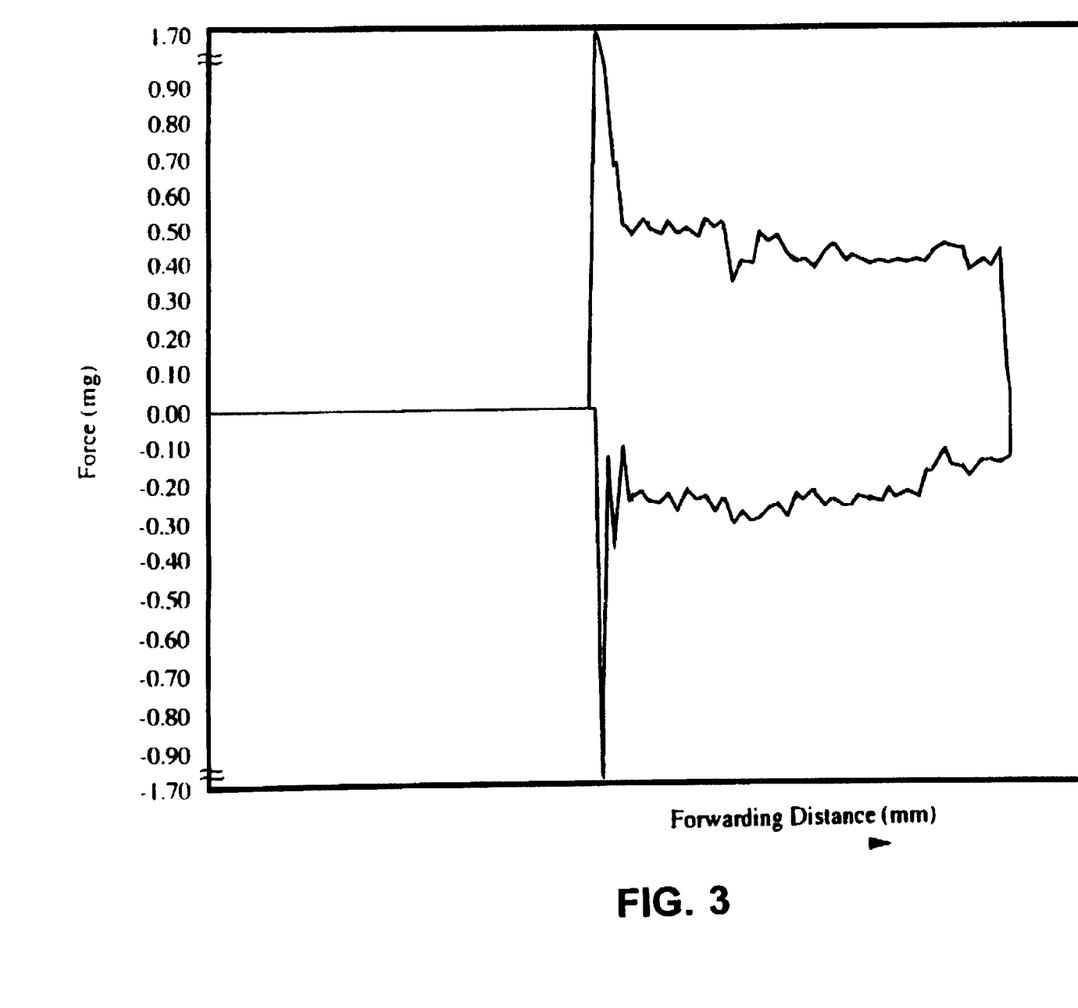
FIG. 3 shows a wetting force analysis of untreated polypropylene fibers.
Figure 4:
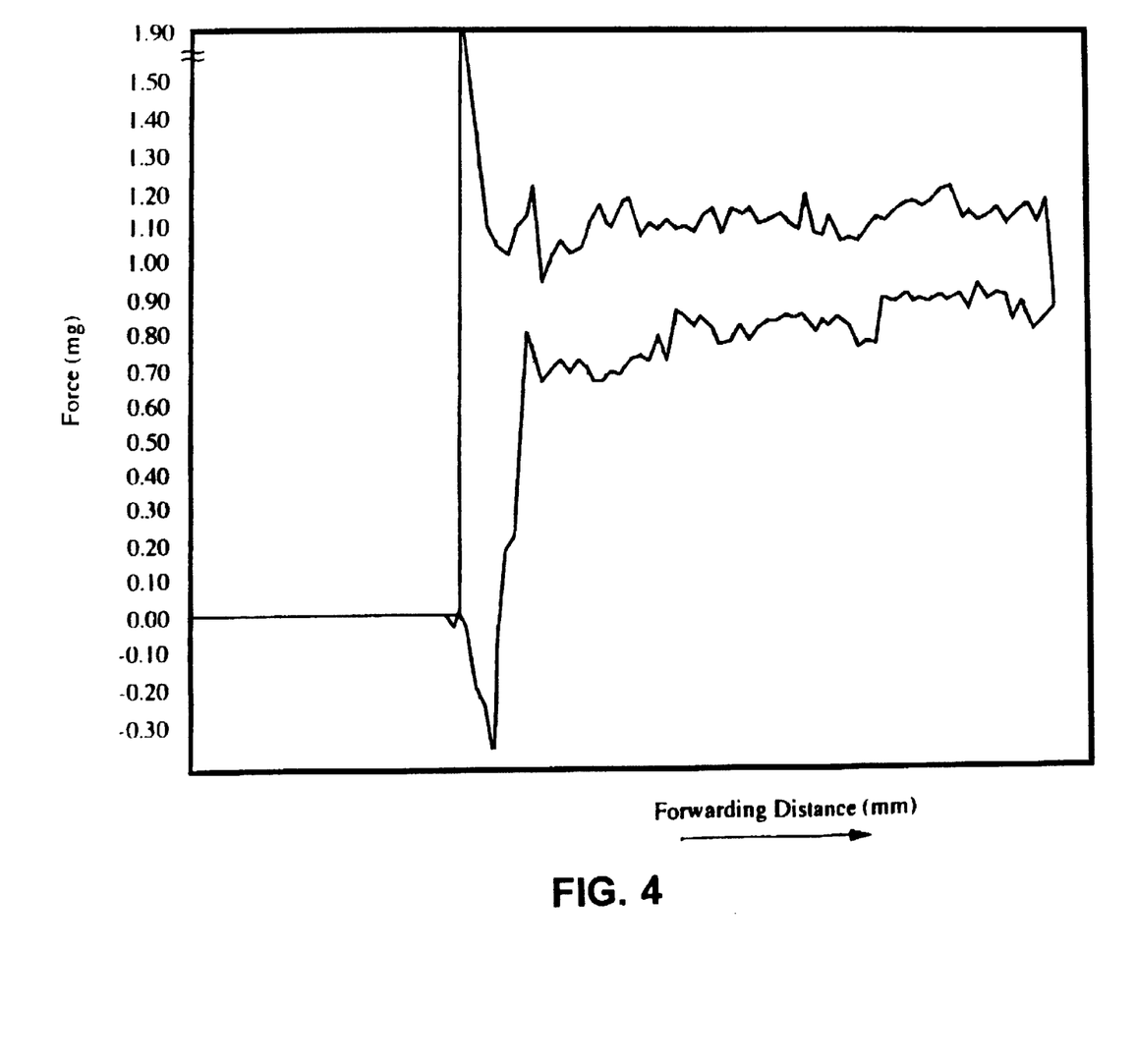
FIG. 4 shows a wetting force analysis of polypropylene fibers treated according to the method of the present invention.

Wettability measurements are in good agreement with the ESCA measurements. FIGS. 3 and 4 present the advancing and receding surface tension estimation data for untreated and $SiCl_4$-plasma-treated polypropylene samples, respectively.

For untreated polypropylene, the advancing and receding contact angles, $\theta_a$ and $\theta_r$, were determined to be 100±6° and 77±5°, respectively ($F_m$=1.90 mg). For polypropylene plasma treated with $SiCl_4$, $\theta_a$ and $\theta_r$ were 66±6° and 58±5°, respectively ($F_m$=1.98 mg). The dramatic decrease of both the advancing and receding contact angles for plasma-treated polypropylene fibers clearly indicates a significantly improved surface wettability.

Example 3

Preparation of Polypropylene-Cement Concrete Composites

All polypropylene-cement concrete composite sample preparations were processed in a similar manner with a compositional ratio for cement:fine aggregate:coarse aggregate:water of 1:2:2:0.57. The cement was type 10 Portland cement obtained from St. Laurent Cement, Quebec, Canada. The coarse aggregate had a maximum particle size of 6.5 mm and was obtained from D'Agostino, Montreal, Quebec, Canada, as was the fine aggregate.

The fine aggregate was first blended with the cement until a uniform mixture was obtained. Then, the coarse aggregate was added and the mixture was thoroughly blended. A homogenous paste was then prepared by adding the proper amount of tap water. Finally, polypropylene fibers, either treated or untreated, were gradually added. The composition was then blended manually until a mixture was produced that was uniform upon visual inspection.

The cement composite mixtures were then cast into plastic molds and were allowed to harden at room temperature under open atmospheric conditions for 24 hours. Two different test shapes were employed in the experiments. A rectangular 76×279 mm sample shape was used for bending test measurements. A cylindrical (OD=51 mm, Height=102 mm) sample shape was used for compressive test estimations. The hardened cement specimens were removed from the molds and were hydrated under saturated limewater conditions for 13 and 27 days, respectively. Each sample was then cured for one day in the air under ambient conditions. Thus, total curing periods were either 14 or 28 days. Six rectangular specimens and six cylindrical specimens of composites containing or lacking treated polypropylene fibers were selected for further testing.

Example 4

Analysis of Polypropylene-Cement Composites

Comparative test data were obtained for both concrete reinforced with untreated polypropylene fibers and concrete reinforced with $SiCl_4$-plasma modified polypropylene fibers. In general, the nature and the amount of the added fibers significantly influence all of the physical-mechanical characteristics of the test specimens except slump, as detailed below.

Slump measurements (ASTMC43-78)

TABLE 3

| Slump of Polypropylene Fiber Reinforced Concrete | | |
|---|---|---|
| Polypropylene Fiber | Slump | |
| Content (% by volume) | 25 mm Untreated | 25 mm Treated |
| 0 | 102 | 102 |
| 0.25 | 96 | 102 |

TABLE 3-continued

| Slump of Polypropylene Fiber Reinforced Concrete | | |
|---|---|---|
| Polypropylene Fiber | Slump | |
| Content (% by volume) | 25 mm Untreated | 25 mm Treated |
| 0.50 | 90 | 90 |
| 0.75 | 84 | 84 |
| 1.00 | 78 | 84 |

The slump of polypropylene fiber reinforced concrete decreased as the polypropylene fiber content increased. Untreated and treated polypropylene fibers had similar effects on the slump of reinforced concrete composites. For example, when 1% by volume of untreated polypropylene fiber was added to a concrete mixture, the slump was decreased from 102 mm to 78 mm and there was a reduction in workability of the concrete.

Flexural strength test (ASTMC78-84)

TABLE 4

| Flexural Strength of Polypropylene Fiber Reinforced Concrete | | | | |
|---|---|---|---|---|
| Polypropylene | Flexural Strength (MPa) | | | |
| Fiber Content (% by volume) | 14-day Untreated | 14-day Treated | 28-day Untreated | 28-day Treated |
| 0 | 4.703 | 4.703 | 4.943 | 4.943 |
| 0.25 | 4.637 | 4.977 | 4.921 | 5.339 |
| 0.50 | 4.538 | 5.046 | 4.856 | 5.236 |
| 0.75 | 4.398 | | 4.598 | |
| 1.00 | 4.310 | 4.753 | 4.422 | 5.098 |

The flexural strength of concrete reinforced with plasma-treated polypropylene fibers was much greater than either unreinforced concrete or concrete reinforced with untreated polypropylene fibers. Untreated polypropylene fibers did not significantly improve the flexural strength when compared to unreinforced concrete. In fact, flexural strength decreased slightly with increasing content of untreated polypropylene fiber of 19 or 25 mm tested after hydration (curing) periods of 14 or 28 days.

In contrast, the flexural strength of concrete reinforced with 0.5% (by volume) of plasma-treated polypropylene fibers increased by 7% over unreinforced concrete. However, when the content of plasma-treated polypropylene fiber was further increased to 1.0% (by volume), the flexural strength decreased for the 14 day curing period. For the 28 day curing period, the flexural strength of concrete containing 0.25% (by volume) of the plasma-treated polypropylene fiber increased by 10%. The flexural strength decreased slightly at higher levels of plasma-treated polypropylene fibers, though the flexural strength of treated fiber reinforced concrete was consistently higher than that of unreinforced concrete.

The improved strength can be attributed to the better mechanical bonding between the treated fibers and the cement. Unlike the untreated polypropylene fibers, which negatively affected the flexural strength of reinforced concrete, in each case the treated polypropylene fibers had a positive effect on flexural strength.

Compressive strength tests (ASTMC39-86)

The compressive strength of the polypropylene fiber-reinforced concrete, measured on an Instron Universal testing machine, also decreased as polypropylene fiber content increased for both lengths of polypropylene fibers and at both hydration periods. This decrease in compressive strength was probably due to inefficient compaction. It was also observed generally that flexural strength and compressive strength were slightly lower when shorter polypropylene fibers were used than when longer fibers were used.

Flexural toughness (JCI Standard for test methods of fiber reinforced concrete)

Flexural toughness is defined as the area under the load-deflection curve up to a deflection of 1/150 of the span expressed in energy units. As shown in Table 5, the toughness of fiber-reinforced concrete increased as the polypropylene fiber content increased for both lengths of polypropylene fibers and for both hydration periods. However, untreated polypropylene fibers exhibited poor bond strength with the concrete matrix, and most fibers separated from the matrix during the bending test (Instron Universal testing machine).

In contrast, a greater increase in toughness and toughness index was observed in concrete reinforced with plasma-treated polypropylene fiber. These observations are attributed to better bonding between the fibers and the concrete matrix as a result of the enhanced reactivity of the fiber surfaces.

TABLE 5

Toughness of Polypropylene Fiber Reinforced Concrete

| Polypropylene Fiber Content (% by volume) | Toughness (Nm) | | | |
| --- | --- | --- | --- | --- |
| | 14-day Untreated | 14-day Treated | 28-day Untreated | 28-day Treated |
| 0 | 4.720 | 4.720 | 4.962 | 4.962 |
| 0.25 | 4.978 | 5.071 | 5.662 | 5.639 |
| 0.50 | 5.873 | 6.366 | 6.680 | 7.336 |
| 0.75 | 6.398 | | 7.277 | |
| 1.00 | 7.503 | 8.133 | 8.533 | 9.258 |

Flexural toughness indices (ASTMC1018-85)

A toughness index is calculated by determining the ratio of areas under the load-deflection curve computed at a specified deflection and the first crack deflection. The calculation of toughness indices are:

$$I_5 = \frac{\text{Area under curve to } 3\delta}{\text{Area under curve to } \delta}$$

$$I_{10} = \frac{\text{Area under curve to } 5.5\delta}{\text{Area under curve to } \delta}$$

$$I_{30} = \frac{\text{Area under curve to } 15.5\delta}{\text{Area under curve to } \delta}$$

where $\delta$ = deflection at the first crack.

TABLE 6

Toughness Index I5 of Polypropylene Fiber Reinforced Concrete

| Polypropylene Fiber Content (% by volume) | 14-day Untreated | 14-day Treated | 28-day Untreated | 28-day Treated |
| --- | --- | --- | --- | --- |
| 0 | 1.00 | 1.00 | 1.00 | 1.00 |
| 0.25 | 1.111 | 1.283 | 1.141 | 1.270 |
| 0.50 | 1.272 | 1.469 | 1.306 | 1.569 |
| 0.75 | 1.398 | | 1.435 | |
| 1.00 | 1.660 | 1.917 | 1.704 | 1.968 |

TABLE 7

Toughness Index I10 of Polypropylene Fiber Reinforced Concrete

| Polypropylene Fiber Content (% by volume) | 14-day Untreated | 14-day Treated | 28-day Untreated | 28-day Treated |
| --- | --- | --- | --- | --- |
| 0 | 1.00 | 1.00 | 1.00 | 1.00 |
| 0.25 | 1.235 | 1.575 | 1.276 | 1.613 |
| 0.50 | 1.513 | 1.929 | 1.563 | 2.255 |
| 0.75 | 1.898 | | 1.961 | |
| 1.00 | 2.367 | 3.018 | 2.454 | 3.073 |

TABLE 8

Toughness Index I10 of Polypropylene Fiber Reinforced Concrete

| Polypropylene Fiber Content (% by volume) | 14-day Untreated | 14-day Treated | 28-day Untreated | 28-day Treated |
| --- | --- | --- | --- | --- |
| 0 | 1.00 | 1.00 | 1.00 | 1.00 |
| 0.25 | 1.722 | 2.227 | 1.826 | 2.362 |
| 0.50 | 2.127 | 2.751 | 2.824 | 3.652 |
| 0.75 | 2.898 | | 3.261 | |
| 1.00 | 3.844 | 4.971 | 4.016 | 5.193 |

The present invention is not intended to be limited to the disclosed examples, but shall encompass all variations and modifications as come within the scope of the following claims.

We claim:

1. A method for reinforcing a cementitious composite material comprising silicon, the method comprising the steps of:

exposing a fibrous hydrocarbon polymer fiber reinforcing agent having greater than 50% carbon atoms on an outer surface to a population of charged, halogenated silicon molecules in a gaseous plasma, in the presence of a material that traps free halogen ions, at an energy level and for a time sufficient to implant a sufficient number of the halogenated silicon molecules onto the surface of the reinforcing agent so that the exposed reinforcing agent has between 10 and 100% silicon atoms, between 0 and 10% halogen atoms, between 10 and 90% oxygen atoms and less than 80% carbon atoms on the surface;

incorporating the exposed reinforcing agent at a concentration of less than 10% by volume into the cementitious composite material; and curing the cementitious composite for a time sufficient to chemically link the exposed reinforcing agent to the cement by Si—O—Si linkages.

2. A method as claimed in claim 1 wherein the reinforcing agent is polypropylene fiber.

3. A method as claimed in claim 1 wherein the exposing step comprises the steps of:

introducing a gaseous, uncharged halogenated silicon material into a gas plasma reactor; and energizing the introduced gas under plasma-generating conditions at an energy level that is sufficiently high to ionize the uncharged material to form the charged halogenated silicon molecules but sufficiently low that a significant percentage of Si-halogen bonds are not broken.

4. A method as claimed in claim 3 wherein the gaseous, uncharged halogenated silicon material is $SiCl_4$.

5. A method as claimed in claim 3 wherein the energy level is between 0.5 eV and 20 eV.

6. A method as claimed in claim 1 wherein the material that traps free halogen ions is aluminum foil.

7. A method as claimed in claim 1 wherein the charged halogenated silicon molecules are selected from the group consisting of $Si^+Cl_3$ and $Si^{30}Cl_2$.

8. A method as claimed in claim 1 wherein the exposed surface has between 10 and 30% silicon atoms, between 0 and 5% halogen atoms, between 40 and 70% oxygen atoms and less than 20% carbon atoms.

9. A method as claimed in claim 1 wherein the exposed reinforcing agent is incorporated into the cementitious composite material at a concentration of less than 5% by volume.

10. A method as claimed in claim 1 wherein the exposed reinforcing agent is incorporated into the cementitious composite material at a concentration of less than 1% by volume.

* * * * *